United States Patent [19]

Kelsey et al.

[11] Patent Number: 5,726,993
[45] Date of Patent: Mar. 10, 1998

[54] SIGNAL DETECTOR FOR TELEPHONE LINE REPEATER REMOTE LOOPBACK SYSTEM

[75] Inventors: Karl A. Kelsey; Romuald Bailey, both of Albuquerque, N. Mex.

[73] Assignee: Siemens Telecom Networks, Boca Raton, Fla.

[21] Appl. No.: 699,377

[22] Filed: Aug. 19, 1996

Related U.S. Application Data

[62] Division of Ser. No. 548,160, Oct. 25, 1995, Pat. No. 5,600,656.
[51] Int. Cl.[6] .................................. G01R 31/28
[52] U.S. Cl. .................................. 371/20.2
[58] Field of Search .................. 371/20.2; 370/243, 370/246, 248, 249, 253; 379/4, 5, 26, 27

[56] References Cited

U.S. PATENT DOCUMENTS

| | | | |
|---|---|---|---|
| 4,042,794 | 8/1977 | Lima et al. | 179/175.3 |
| 4,402,075 | 8/1983 | Bargeton et al. | 370/15 |
| 4,710,924 | 12/1987 | Chum | 371/4 |
| 4,713,810 | 12/1987 | Chum | 371/4 |
| 4,730,313 | 3/1988 | Stephenson et al. | 371/5 |
| 4,742,518 | 5/1988 | Shedd | 371/22 |
| 4,939,747 | 7/1990 | Adler | 375/3.1 |
| 4,980,887 | 12/1990 | Dively et al. | 371/20.2 |
| 5,010,544 | 4/1991 | Chang et al. | 370/13.1 |
| 5,060,226 | 10/1991 | Gewin et al. | 370/15 |
| 5,200,979 | 4/1993 | Harris | 375/19 |
| 5,226,120 | 7/1993 | Brown et al. | 395/200 |
| 5,247,690 | 9/1993 | Fain | 395/800 |
| 5,337,306 | 8/1994 | Hall | 370/13 |
| 5,339,307 | 8/1994 | Curtis | 370/13.1 |
| 5,437,023 | 7/1995 | Sheets et al. | 395/575 |
| 5,553,059 | 9/1996 | Emerson et al. | 370/14 |

OTHER PUBLICATIONS

"Dictionary of Computers, Information Processing, and Telecommunications" 2nd Ed., Joan Wiley & Sons, Rosenberg, p. 575.

Primary Examiner—Robert W. Beausoliel, Jr.
Assistant Examiner—Stephen C. Elmore
Attorney, Agent, or Firm—Joseph S. Codispoti

[57] ABSTRACT

A loopback enabled by an instruction and address code pair transmitted with the regular data stream affords a simplified fault location scheme for a T1 repeater span. By selecting unique addresses for each repeater using a predetermined frame sequence and by testing for logic error density, erroneous enablement is avoided.

19 Claims, 4 Drawing Sheets

SIGNAL DETECTOR FOR TELEPHONE LINE REPEATOR REMOTE LOOPBACK SYSTEM

CROSS-REFERENCE TO RELATED APPLICATION

This is a divisional of U.S. application Ser. No. 08/548,160, filed Oct. 25, 1995, which issued as U.S. Pat. No. 5,600,656 on Feb. 4, 1997.

FIELD OF THE INVENTION

This invention generally relates to telephone line repeaters. Specifically, the invention is directed to a method and apparatus for remote loopback testing of such repeaters.

BACKGROUND OF THE INVENTION

In a T1 telephone circuit, repeaters are located at intervals along the line to boost the signal. Collectively, these components comprise what is referred to as a span. Occasionally, individual repeaters may fail and some means of testing and locating a defective repeater is required.

Until now, elaborate analog circuitry and extra wiring was required to perform such testing. Such arrangements are costly. It would be useful to have a simplified and cost-effective method of accessing individual repeaters in a span so that tests could be run to check performance.

SUMMARY OF THE INVENTION

These and other objects are achieved by a remotely, addressable repeater for a T1 span that permits remote loopback testing. Each repeater typically has a pair of repeater modules, one for the transmit side and the other for the receive side. The repeater also has a loopback detector for sensing the receipt of an instruction code and repeater address transmitted in the normal data stream i.e., as inchannel signals.

Upon receipt of the instruction code, the repeater loopback detector will look for its address in the bit stream. If it recognizes its own address, the loopback detector will instruct the repeater to initiate a loopback. Data is then routed through the repeater, from one side to the other, back to the originating station.

One advantage of the invention over previous analog fault location schemes is that no additional lines are required, reducing installation and maintenance costs. It also allows real-time analysis of the line and the repeaters from a remote site.

The invention uses unique address codes for each of the repeaters which when combined with any random sequence of bits will not result in a valid address, thus erroneously enabling a loopback detector. Also, any repeater in a span can be addressed.

Additionally, the loopback detector has a logic error density counter. By allowing a predetermined maximum logic error density for the instruction code and the repeater address, the system will maintain functional integrity in the face of a relatively high bit error rate. The logic error density counter also ensures that no superframe or extended superframe sequence could inadvertently enable the decoder.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
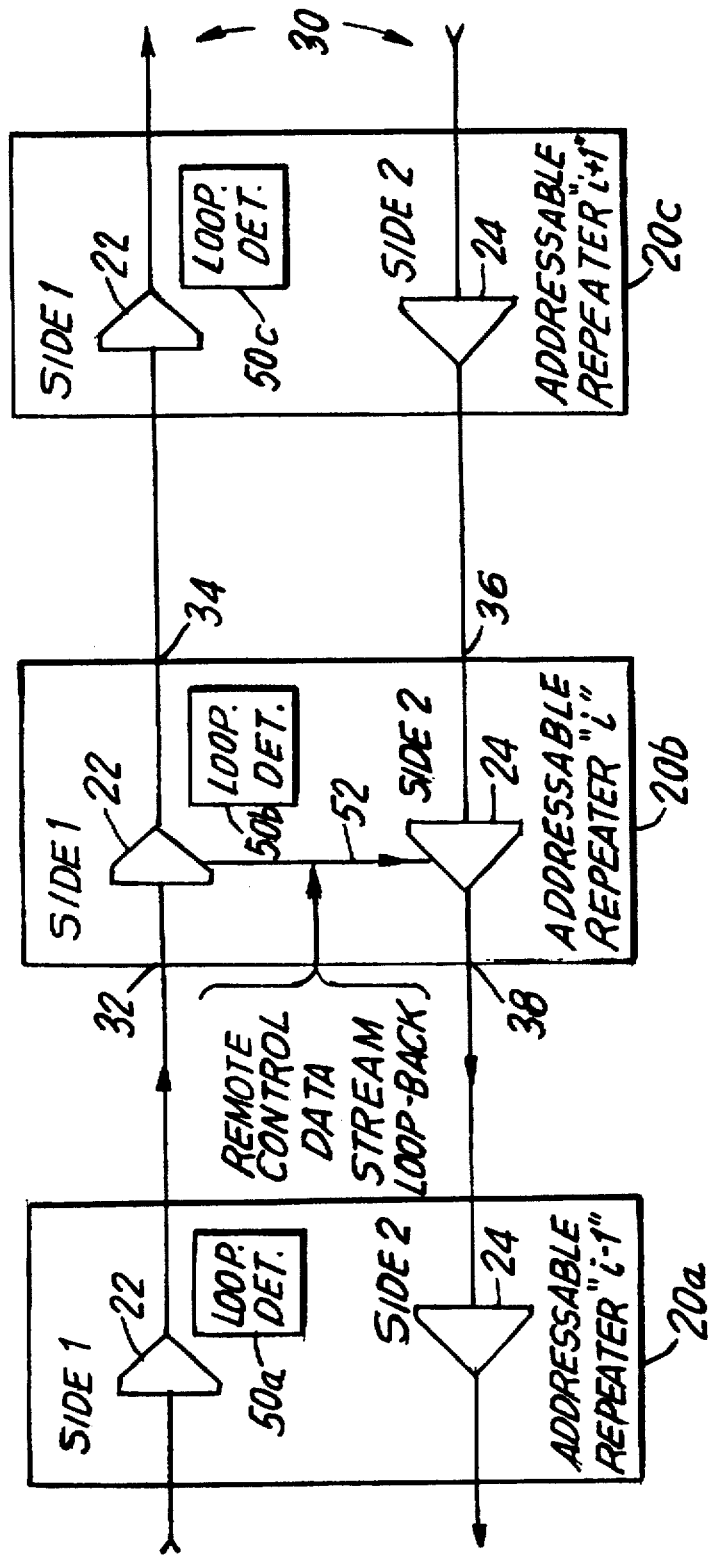
FIG. 1 is a schematic block diagram of a portion of a T1 repeater span.

A portion of a T1 repeater span 10 is shown in FIG. 1. The span 10 has several repeaters i−1, i, and i+1 20a, b, and c positioned at intervals on a T1 transmission line 30. Each repeater 20 has two repeater modules 22 and 24, one being arbitrarily designated the side 1 repeater module 22 and the other being designated the side 2 repeater module 24. At each repeater 20, the segment of the transmission line 30 entering the repeater 20 on side 1 is designated the receive input line 32 while the line leaving the repeater 20 on that side is designated the transmit output line 34. Similarly, the segment of the transmission line 30 entering the repeater 20 on side 2 is designated the receive input line 36 while the line leaving the repeater 20 on the same side is designated the transmit output line 38.

In addition, each repeater 20a, b, and c has a loopback detector 50a, b, and c, respectively. When the loopback detector 50 is properly enabled in one of the repeaters 20, the loopback detector 50 enables a loopback path 52 between the two repeater modules 22 and 24.

Figure 2:
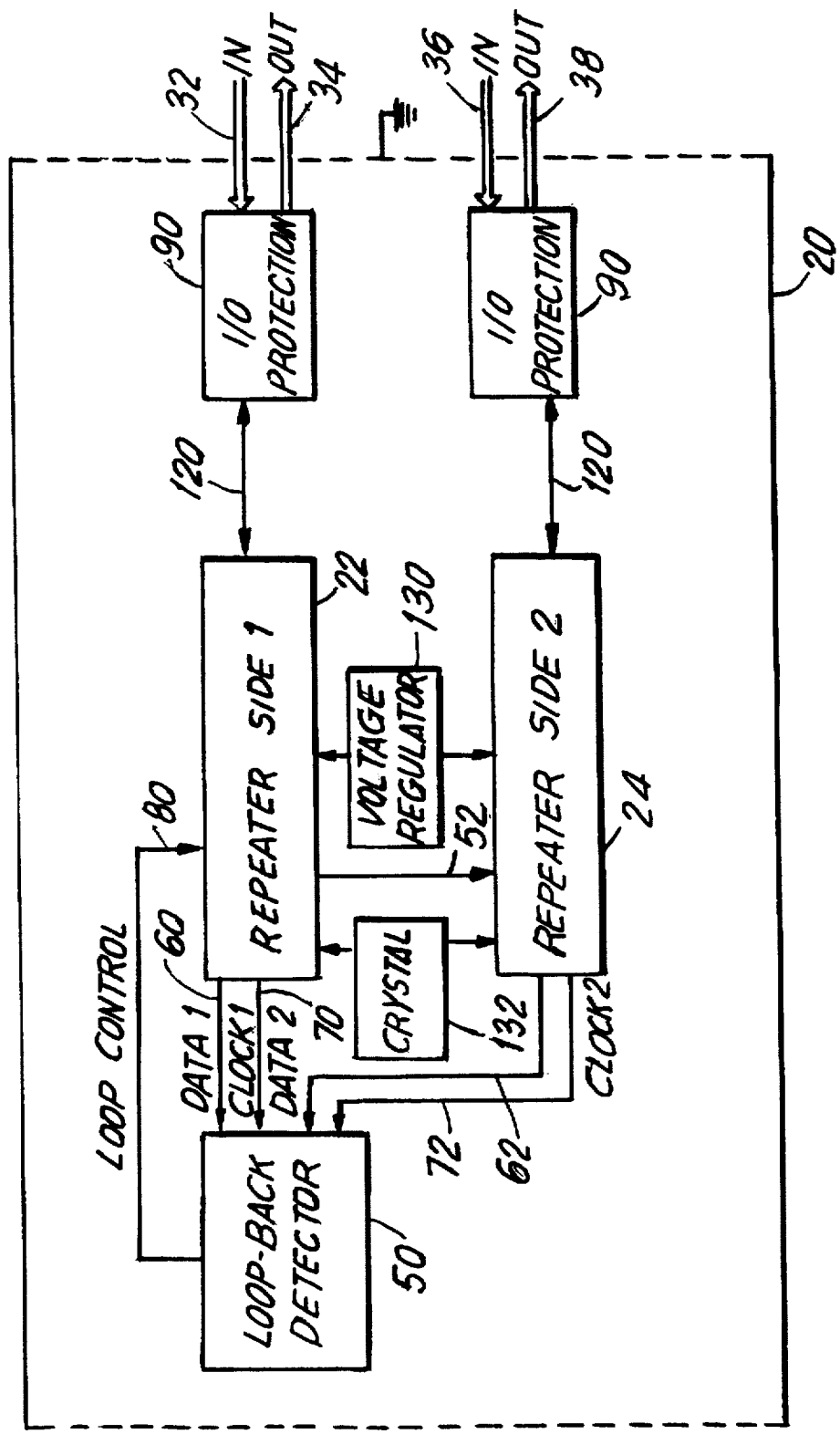
FIG. 2 is a schematic block diagram of a T1 repeater.

The repeater 20 is shown in greater detail in the block diagram of FIG. 2. The repeater modules 22 and 24 are connected to the loopback detector 50 by data lines data1 60 and data2 62 and clock lines clock1 70 and clock2 72, respectively. A loopback control line 80 carries the loopback command from the loopback detector 50 to the side 1 repeater module 22.

Normally, the loopback detector 50 receives the data from the data1 line 60. However, when a loopback 52 is enabled, it should be understood that the repeater module 22 in this configuration does not pass the input signal on to the next repeater 20 in the span. Therefore, the loopback detector 50 must pick up data from the data2 line 62. To accomplish this, the loopback detector 50 is selectively connected to both of the data lines data1 60 and data2 62, as will be explained below.

Each repeater module 22 and 24 is provided with a conventional I/O protection module 90. The I/O protection module 90 for the side 1 repeater module 22 is connected to the receive input line 32 and the transmit output line 34. Similarly, the I/O protection module 90 for the side 2 repeater module 24 is connected to the receive input line 36 and the transmit output line 38. Each I/O protection module 90 is connected to its respective repeater module 22 or 24 by an internal I/O line pair 120.

The repeater 20 also has a voltage regulator 130 and a clock crystal 132. The voltage regulator 130 provides supply voltage to the repeater modules 22 and 24, and the loopback detector 50 (connection not shown). The crystal 132 serves as a reference for each module's 22 and 24 internal clock (not shown).

The Loopback Detector

Figure 3:
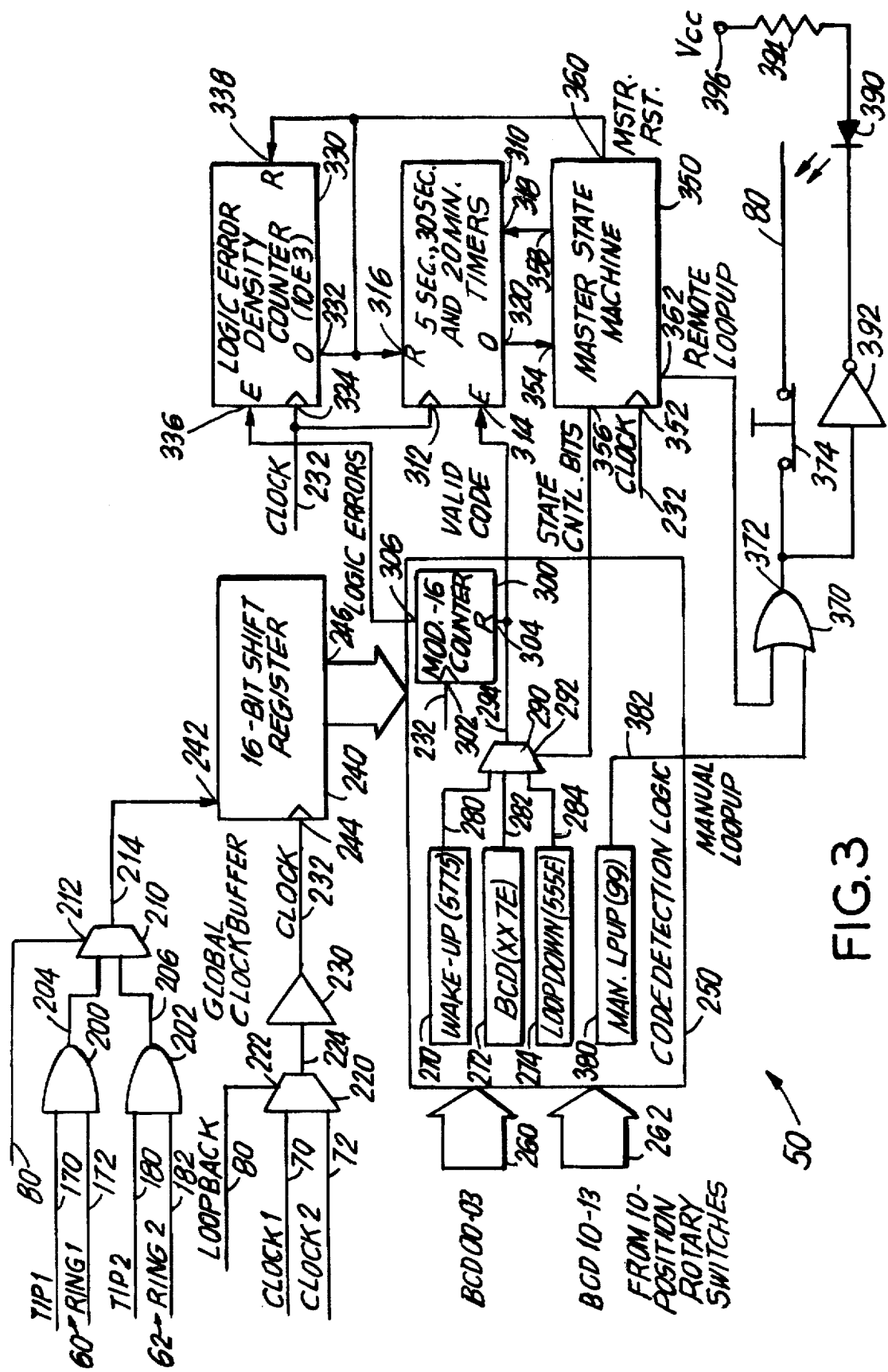
FIG. 3 is a schematic block diagram of a loopback detector.

A block schematic diagram of the loopback detector 50 is shown in FIG. 3. As shown in the previous figure, the loopback detector 50 is connected to the two data lines data1 60 and data2 62. The data1 line 60 connected to the side 1 repeater module 22 has a tip1 line 170 and a ring1 line 172; the data2 line 62 connected to the side 2 repeater module 24 has a tip2 line 180 and a ring2 line 182. Similarly, there are the two clock lines clock1 70 and clock2 72 from the respective repeater modules 22 and 24.

Tip1 170 and ring1 172 lines are provided to an AND-gate 200 and tip2 180 and ring2 182 lines are provided to an AND-gate 202. The respective outputs 204 and 206 of the AND-gates 200 and 202 form the inputs to a 2:1 data multiplexer 210, which has a control input 212 and an output 214.

Clock1 70 and clock2 72 lines form the inputs to a 2:1 clock multiplexer 220, which has a control input 222 and an output 224. The multiplexer output 224 feeds a global clock buffer 230, which has an output 232.

The data received on data lines 60 and 62 is selectively funnelled by the data multiplexer 210 through a 16-bit shift register 240. The shift register 240 has a data input 242, a clock input 244, and a 16-bit parallel data output 246. The data input 242 is connected to the output 214 of the data multiplexer 210 and the clock input 244 is connected to the output 232 of the global clock buffer 230.

The 16-bit parallel data output 246 of the shift register 240 is connected to a code detection logic module 250. The logic module 250 performs the actual decoding of the messages received on the data lines 60 and 62.

In addition to the 16-bit parallel data output 246 of the shift register 240, the logic module 250 has inputs 260 and 262 from two 10-position rotary switches (not shown) for setting and registering the address of the repeater 20. With two such inputs, there can be a total of 99 repeaters (i.e., 0–98; 99 is reserved for manual override as explained below); this number can be increased by providing additional inputs and switches.

There are three code detectors 270, 272, and 274 in the logic module 250, which search the incoming data for the wake-up (5775H), address (XX7EH), and loopdown (555EH) commands, respectively. If any of the code detectors 270, 272, or 274 detect a valid sequence, they will issue a valid code signal on their respective outputs 280, 282, and 284. These outputs 280, 282, and 284 are provided to a code detector multiplexer 290. The multiplexer 290 has a control input 292 and a data output 294.

The codes have been selected to provide unique sequences to avoid erroneous triggering. Each code is contained in a 16-bit frame. In the case of the address code, the framing bits are 7EH, which contains six sequential 1s.

The logic module 250 also has a modulo-16 counter 300, which has a clock input 302, a reset input 304, and a data output 306. The clock input 302 is taken from the global clock buffer output 232 and the reset signal is provided by the output 294 of the code detector multiplexer 290.

If a valid code is received, the counter 300 is reset and a valid code signal is passed on by the multiplexer 290. If a valid code is not received, the counter 300 will reach its maximum count and its data output 306 will go high.

The output 294 of the code detector multiplexer 290 is used to enable a timer module 310, which has a clock input 312, an initialization port 314, a reset port 316, a timing state input 318, and an output 320. The clock input 312 is taken from the global clock buffer output 232. The initialization port 314 is connected to the output 294 of the code detector multiplexer 290.

The timer module 310 has the ability to count over three different time intervals (5 seconds, 30 seconds, and 20 minutes) individually and collectively selectable by providing the proper signal to the timing state input 318. As will be explained below in connection with the operation of the loopback detector 50, the timer module 310 in one instance is simultaneously counting 5 and 30 second periods, with independent resets. If desired, the timer module 310 can be implemented as independent state machines.

A logic error density counter 330 provides an error density signal at an error output port 332 which in turn is connected to the reset port 316 of the timer module 310. The error density counter 330 has a clock input 334 and a data input 336, the latter being connected to the data output 306 of the modulo-16 counter 300. The error density counter 330 also has a reset port 338.

Figure 4:
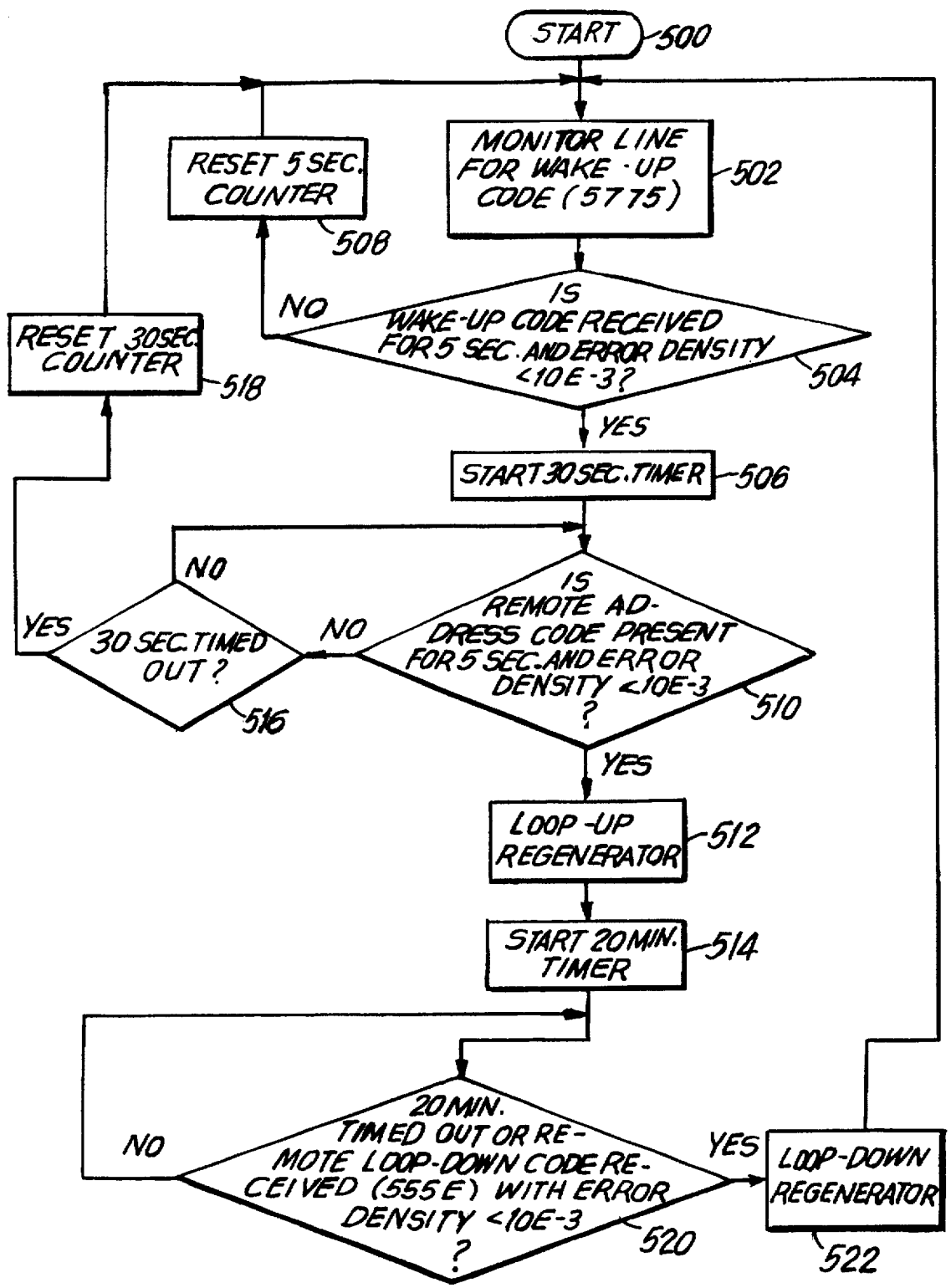
FIG. 4 is a flow chart of the operation of the loopback detector.

For control, the loopback detector 50 has a master state machine 350, which is programmed to function in accordance with the flow chart of FIG. 4. The state machine 350 is clocked at a clock input 352 and receives an input at an input port 354.

The state machine 350 issues state control bits to the code detector multiplexer 290 at a state output 356 and state enablement signals to the timer module 310 at a state enablement output 358. Also, the state machine 350 issues master reset signals at a master reset port 360, which is connected to the reset ports 316 and 338 of the timer module 310 and the error density counter 330, respectively. Finally, the state machine 350 has a remote loopup output 362 which is provided to an OR-gate 370 along with the output 382 of a manual loopup code detector 380. This latter detector is connected to the inputs 260 and 262 from the two 10-position rotary switches, and is enabled when the switches are set to 99. (It should be understood that a setting other than 99 could be used.)

The output 372 of the OR-gate 370 provides the loopup signal 80 to the side 1 repeater module 22 to initiate a loopup. This signal is also provided to the control input 212 of the data multiplexer 210 and the control input 222 of the clock multiplexer 220. It can also be used to enable a loopup LED 390 through an inverter 392. The LED 390 is connected to a pull-up resistor 394 which in turn is connected to $V_{cc}$ 396.

For manual override enabling a loopback, the ten-position rotary switches are set to 99, enabling OR-gate 370. To manually disable the loopback detector 50, a switch 374 will disengage the output 372 of the OR-gate 370.

The loopback controller 50 can be implemented in a field programmable gate array ("FPGA"), which is configured by the user to provide the logic functions desired. In the embodiment under discussion, Xilinx 3000 family of FPGAs, available from Xilinx, 2100 Logic Drive, San Jose, Calif., were used. These components, as well as the methods for configuring and programming them, are described in detail in the 1992 Xilinx Programmable Gate Array Databook. Of course, one could use dedicated logic chips or other suitable devices.

Operation of the Loopback Detector

The operation of the loopback detector 50 will now be discussed with reference to the flow chart of FIG. 4. The number in parentheses refer to the blocks of the flow chart.

At the start (500), the loopback detector 50 is monitoring the incoming data line 60 for the codes that would signal a loopback operation. The first code that the detector 50 looks for is the wake-up code 5775H (502). If the wake-up code is received, the timer module 310 checks to see if the code is sustained for a period of at least 5 seconds and that the error density is no greater than one error in a thousand (504). If so, the timer module 310 is directed by the master state machine 350 to commence a 30 second timing period (506).

Should the wake-up code not be present for the minimum 5 second period, the modulo-16 counter 300 will reach a maximum count, triggering a logic error and if the logic error density exceeds one error in a thousand, the timer module 310 will be reset by the output 332 of the logic error density counter 330 (508). The sequence then starts anew (502).

During the 30-second timing period, the loopback detector 50 looks for a valid address code XX7EH for a sustained period of at least 5 seconds and an error density of not greater than one error in a thousand (510). If these two conditions are satisfied, the master state machine 350 will issue a loopup command to the side 1 repeater module 22 (512). This will in turn trigger the start of a 20 minute timing period (514).

Should the address code not be present for the minimum 5 second period, the modulo-16 counter 300 will again reach a maximum count triggering a logic error which is passed on by the logic error density counter 330 to the timer module 310 as a reset command (510). The detector 50 will keep checking for a valid address code for the minimum 5 second period, until the 30 second period is exhausted (516). At that point, the timer module 310 is reset (518), and the detector 50 begins looking for another wake-up code (502).

Once in the loopback mode, the loopback detector 50 will await receipt of the loopdown code 555EH on the side 2 data line 62 (520). If the loopdown code is received for the minimum time period with the required maximum error density, then the loopback is disabled (522) and the loopback detector 50 resumes its search for the wake-up code (502). If the period of 20 minutes elapses before the loopdown code is received, the detector 50 will disable the loopback on its own (522).

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, the codes and their associated word lengths employed are arbitrary—others could have been selected. Also, the timing periods and permissible error densities are arbitrary.

What is claimed is:

1. A repeater having a unique address designation, wherein the repeater comprises:
   first detection means for detecting a first inchannel signal, the first inchannel signal being representative of an enabling command;
   enabling means, responsive to the first detection means, for enabling the detection of a second inchannel signal, the second inchannel signal being representative of the unique address designation;
   second detection means, responsive to the enabling means, for detecting the second inchannel signal; and
   means, responsive to the second detection means, for initiating a loopback.

2. A repeater as set forth in claim 1, further comprising
   third detection means for detecting a third inchannel signal, the third inchannel signal being representative of a disabling command; and
   means, responsive to the third detection means, for disabling the loopback.

3. A repeater as set forth in claim 2, wherein the inchannel signals are code sequences.

4. A repeater as set forth in claim 1, wherein
   the means for enabling comprises means for determining whether the detected first inchannel signal is valid; and
   the second detection means comprises means for determining whether the detected second inchannel signal is valid.

5. A repeater as set forth in claim 4, wherein
   the means for determining whether the detected first inchannel signal is valid comprises means for determining whether the first inchannel signal is present for at least a predetermined interval of time; and
   the means for determining whether the detected second inchannel signal is valid comprises means for determining whether the second inchannel signal is present for at least a predetermined interval of time.

6. A repeater as set forth in claim 5, wherein the means for determining whether the detected second inchannel signal is valid further comprises means for determining whether the second inchannel signal is detected within a predetermined interval of time.

7. A repeater as set forth in claim 5, wherein
   the means for determining whether the detected first inchannel signal is valid further comprises means for detecting errors in the detected first inchannel signal; and
   the means for determining whether the detected second inchannel signal is valid further comprises means for detecting errors in the detected second inchannel signal.

8. A repeater as set forth in claim 7, wherein each of the means for detecting errors comprises means for determining the density of errors in the detected signals.

9. A signal detector for a repeater having a unique address designation, comprising:
   first detection means, responsive to inchannel signals, for detecting a first inchannel code sequence, the first inchannel code sequence being representative of an enabling command;
   enabling means, responsive to the first detection means, for enabling the detection of a second inchannel code sequence, the second inchannel code sequence being representative of the unique address designation, where the means for enabling comprises
      means for determining whether the first inchannel code sequence is present for at least a predetermined interval of time; and
      means for determining the density of errors in the detected first inchannel code sequence;
   second detection means, responsive to the enabling means and inchannel signals, for detecting the second inchannel code sequence, where the second detection means comprises
      means for determining whether the second inchannel code sequence is detected within a predetermined interval of time;
      means for determining whether the second inchannel code sequence is present for at least a predetermined interval of time; and
      means for determining the density of errors in the detected second inchannel code sequence;
   means, responsive to the second detection means, for initiating a loopback;
   third detection means for detecting a third inchannel code sequence, the third inchannel code sequence being representative of a disabling command, where the third detection means comprises means for determining the density of errors in the detected third inchannel code sequence; and
   means, responsive to the third detection means, for disabling the loopback.

10. A method for initiating a loopback in a repeater in response to inchannel signals, where the repeater has a unique address designation, comprising the steps of:

detecting a first inchannel signal, the first inchannel signal being representative of an enabling command;

in response to the step of detecting a first inchannel signal, enabling the detection of a second inchannel signal, the second inchannel signal being representative of the unique address designation;

in response to the step of enabling, detecting the second inchannel signal; and in response to the step of detecting the second inchannel, initiating a loopback.

11. A method as set forth in claim 10, further comprising the steps of detecting a third inchannel signal, the third inchannel signal being representative of a disabling command; and disabling the loopback in response to the step of detecting a third inchannel signal.

12. A method as set forth in claim 11, wherein the inchannel signals are code sequences.

13. A method as set forth in claim 10, wherein the step of enabling the detection of a first inchannel signal comprises the step of determining whether the detected first inchannel signal is valid; and the step of detecting the second inchannel signal comprises the step of determining whether the detected second inchannel signal is valid.

14. A method as set forth in claim 13, wherein the step of determining whether the detected first inchannel signal is valid comprises the step of determining whether the first inchannel signal is present for at least a predetermined interval of time; and the step of determining whether the detected second inchannel signal is valid comprises the step of determining whether the second inchannel signal is present for at least a predetermined interval of time.

15. A method as set forth in claim 14, wherein the step of determining whether the detected second inchannel signal is valid comprises the step of determining whether the second inchannel signal is detected within a predetermined interval of time.

16. A method as set forth in claim 14, wherein the step of determining whether the detected first inchannel signal is valid further comprises the step of detecting errors in the detected first inchannel signal; and the step of determining whether the detected second inchannel signal is valid further comprises the step of detecting errors in the detected second inchannel signal.

17. A method as set forth in claim 16, wherein the steps of detecting errors in the detected signals each comprise the step of determining the density of errors in the detected signals.

18. A method of detecting signals for initiating a loopback in a repeater having a unique address designation, comprising:

detecting a first inchannel code sequence, the first inchannel code sequence being representative of an enabling command;

enabling the detection of a second inchannel code sequence, the second inchannel code sequence being representative of the unique address designation, where the step of enabling comprises the steps of determining whether the first inchannel code sequence is present for at least a predetermined interval of time; and determining the density of errors in the first inchannel detected code sequence;

detecting the second inchannel code sequence, where the step of detecting the second inchannel code comprises the steps of determining whether the second inchannel code sequence is detected within a predetermined interval of time;

determining whether the second inchannel code sequence is present for at least a predetermined interval of time; and determining the density of errors in the detected second inchannel code sequence;

in response to the step of detecting the second inchannel code sequence, initiating a loopback;

detecting a third inchannel code sequence, the third inchannel code sequence being representative of a disabling command, where the step of detecting a third inchannel code sequence comprises the step of determining the density of errors in the detected third inchannel code sequence; and disabling the loopback in response to the step of detecting a third inchannel code sequence.

19. A signal detector for a repeater having a unique address designation and being responsive to inchannel code sequences comprising wake-up, address, and loopdown codes, the signal processor comprising:

code detection logic comprising wake-up code detection logic for detecting the wake-up code;

address code detection logic for detecting the address code; and loopdown code detection logic for detecting the loopdown code;

timing logic comprising a first timer for determining whether a detected inchannel code sequence is present for at least a predetermined interval of time;

a second timer for determining whether the address code is received within a predetermined time interval; and a third timer for determining whether the duration of a loopback has exceeded a predetermined time interval;

error density counter logic for determining the density of errors in a detected inchannel code sequence; and a state machine comprising first state means, responsive to the wake-up code detection logic, for enabling the first timer and the error density counter logic;

second state means, responsive to the first state means, the first timer, and the error density counter logic, for enabling the second timer;

third state means, responsive to the address code detection logic, the first and second timers, and the error density counter logic, for initiating a loopback and enabling the third timer; and fourth state means, responsive to the third timer, the loopdown code detection logic, and the error density counter logic, for disabling the loopback.

* * * * *